(12) United States Patent
Park et al.

(10) Patent No.: US 10,906,098 B2
(45) Date of Patent: Feb. 2, 2021

(54) FABRICATION OF THREE-DIMENSIONAL POROUS ANODE ELECTRODE

(71) Applicant: CellMobility, Inc., Berkeley, CA (US)

(72) Inventors: Hyeji Park, Seoul (KR); Hyelim Choi, Seoul (KR); Heeman Choe, Kyunggi-do (KR)

(73) Assignee: CellMobility, Inc., Berkeley, CA (US)

( * ) Notice: Subject to any disclaimer, the term of this patent is extended or adjusted under 35 U.S.C. 154(b) by 678 days.

(21) Appl. No.: 15/215,519

(22) Filed: Jul. 20, 2016

(65) Prior Publication Data
US 2017/0025683 A1    Jan. 26, 2017

Related U.S. Application Data

(60) Provisional application No. 62/194,564, filed on Jul. 20, 2015, provisional application No. 62/194,677, filed on Jul. 20, 2015.

(51) Int. Cl.
*H01M 4/80* (2006.01)
*B22F 3/10* (2006.01)
(Continued)

(52) U.S. Cl.
CPC .............. *B22F 3/10* (2013.01); *B22D 15/00* (2013.01); *B22D 21/005* (2013.01); *B22D 25/005* (2013.01); *B22F 3/1143* (2013.01); *B22F 3/24* (2013.01); *B22F 5/10* (2013.01); *H01M 4/0404* (2013.01); *H01M 4/0485* (2013.01); *H01M 4/13* (2013.01); *H01M 4/134* (2013.01); *H01M 4/387* (2013.01); *H01M 4/523* (2013.01);
(Continued)

(58) Field of Classification Search
CPC .......... H01M 4/661; B22F 3/10; B22F 3/1143
See application file for complete search history.

(56) References Cited

U.S. PATENT DOCUMENTS

| 4,362,647 A | 12/1982 | Torigai et al. |
| 2004/0219432 A1 | 11/2004 | Kojami |
| (Continued) | | |

FOREIGN PATENT DOCUMENTS

| JP | 2009199744 A | 3/2009 |
| KR | 1020040096381 | 1/2004 |
| (Continued) | | |

OTHER PUBLICATIONS

Carl A. Reiser et al., "A Reverse-Current Decay Mechanism for Fuel Cells," Electrochemical and Solid-State Letters, 2005, 8 (6) A273-A276 (2005), pp. A273-A276.

(Continued)

*Primary Examiner* — Bach T Dinh
(74) *Attorney, Agent, or Firm* — Aka Chan LLP

(57) ABSTRACT

An electrode for the use of an advanced lithium battery is fabricated using three-dimensionally structured metal foam coated with an active material. The metal foam is porous metal foam that can be used as an anode current collector of a lithium-ion battery and is coated with an anode active material, such as tin, through a sonication-assisted electroless plating method. Additionally, the coated metal foam is heat-treated at an appropriate temperature in order to improve the integrity of the coating layer and hence, the cyclic performance of the lithium-ion battery.

17 Claims, 13 Drawing Sheets

(51) Int. Cl.
| | |
|---|---|
| H01M 4/13 | (2010.01) |
| B22F 3/11 | (2006.01) |
| B22D 15/00 | (2006.01) |
| B22D 21/00 | (2006.01) |
| B22D 25/00 | (2006.01) |
| B22F 3/24 | (2006.01) |
| B22F 5/10 | (2006.01) |
| H01M 4/04 | (2006.01) |
| H01M 4/52 | (2010.01) |
| H01M 4/66 | (2006.01) |
| H01M 4/134 | (2010.01) |
| H01M 4/38 | (2006.01) |
| H01M 10/0525 | (2010.01) |
| H01M 4/02 | (2006.01) |

(52) U.S. Cl.
CPC ........... *H01M 4/661* (2013.01); *H01M 4/801* (2013.01); *B22F 2003/242* (2013.01); *B22F 2201/01* (2013.01); *B22F 2201/03* (2013.01); *B22F 2301/205* (2013.01); *B22F 2301/35* (2013.01); *B22F 2998/10* (2013.01); *B22F 2999/00* (2013.01); *H01M 10/0525* (2013.01); *H01M 2004/021* (2013.01)

(56) References Cited

U.S. PATENT DOCUMENTS

| | | | |
|---|---|---|---|
| 2006/0231135 A1 | 10/2006 | Murai et al. | |
| 2009/0029265 A1 | 1/2009 | Ota | |
| 2010/0015490 A1 | 1/2010 | Yamada | |
| 2010/0133110 A1 | 6/2010 | Nocera et al. | |
| 2012/0121976 A1 | 5/2012 | Koshina | |
| 2012/0208072 A1* | 8/2012 | Park | H01M 4/02 429/163 |
| 2014/0004441 A1* | 1/2014 | Cho | H01M 4/8807 429/480 |
| 2015/0072236 A1* | 3/2015 | Um | C22C 1/0408 429/219 |
| 2015/0221930 A1* | 8/2015 | Manivannan | H01M 4/1395 427/113 |
| 2017/0263939 A1* | 9/2017 | Lin | H01G 11/28 |

FOREIGN PATENT DOCUMENTS

| | | |
|---|---|---|
| KR | 1353262 B1 * | 1/2014 |
| KR | 1410061 B1 * | 6/2014 |

OTHER PUBLICATIONS

A. Bazylak et al., "Effect of compression on liquid water transport and microstructure of PEMFC gas diffusion layers," Journal of Power Sources 163 (2007), pp. 784-792.

W. R. Chang et al., "Effect of clamping pressure on the performance of a PEM fuel cell," Journal of Power Sources 166 (2007), pp. 149-154.

Jiabin Ge et al., "Effect of gas diffusion layer compression on PEM fuel cell performance," Journal of Power Sources 159 (2006), pp. 922-927.

Deville, Sylvain, Eduardo Saiz, and Antoni P. Tomsia. "Ice-templated Porous Alumina Structures." Acta Materialla 55.6 (2007): 1965-974. Web.

Wu, G., K. L. More, C. M. Johnston, and P. Zelenay. "High-Performance Electrocatalysts for Oxygen Reduction Derived from Polyaniline, Iron, Cobalt." Science 332.6028 (2011): 443-47. Web.

Fife, J.I., J.c. Li, D.c. Dunand, and P.w. Voorhees. "Morphological Analysis of Pores in Directionally Freeze-cast Titanium Foams." Journal of Materials Research J. Mater. Res. 24.01 (2009): 117-24. Web.

Jiang et al, Jul. 2010, "Surface-Nitrided Nickel with bifunctional structure as low-cost counter electrode for dye-sensitized solar cell."

Richardson et al, "Crystalline size distribution of sintered Nickel catalysts," 1978.

* cited by examiner

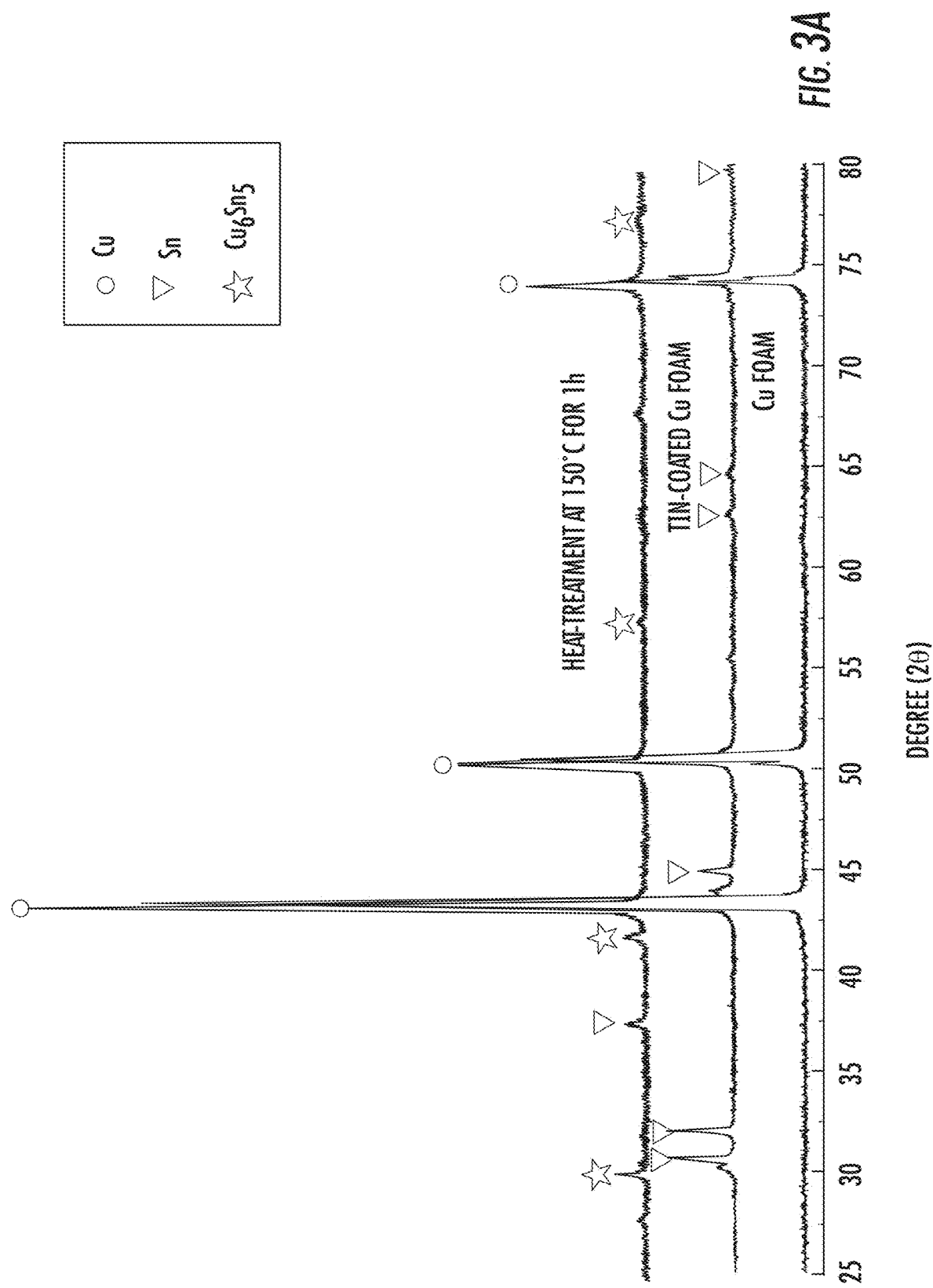

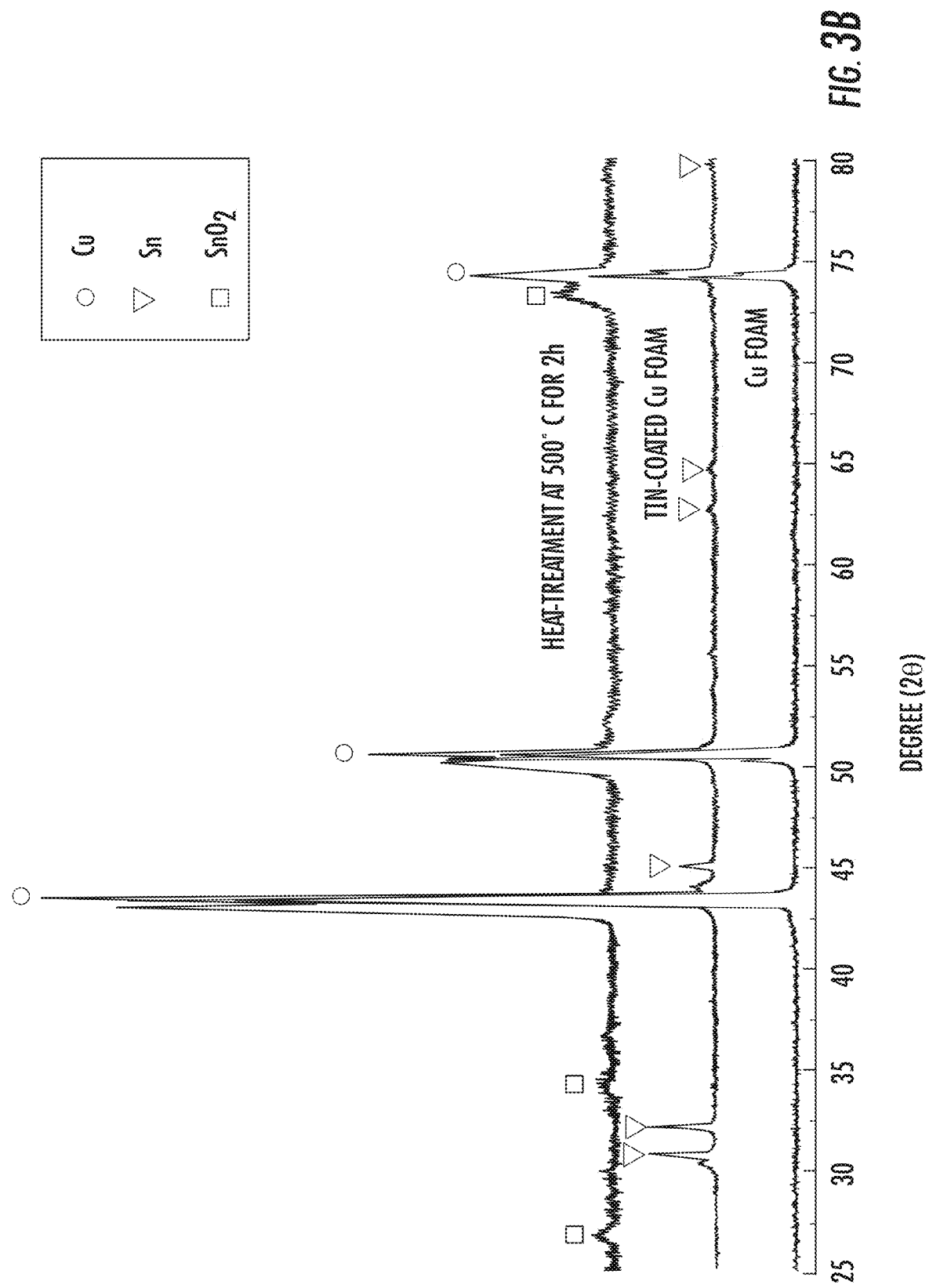

TIN-COATED Cu FOAM
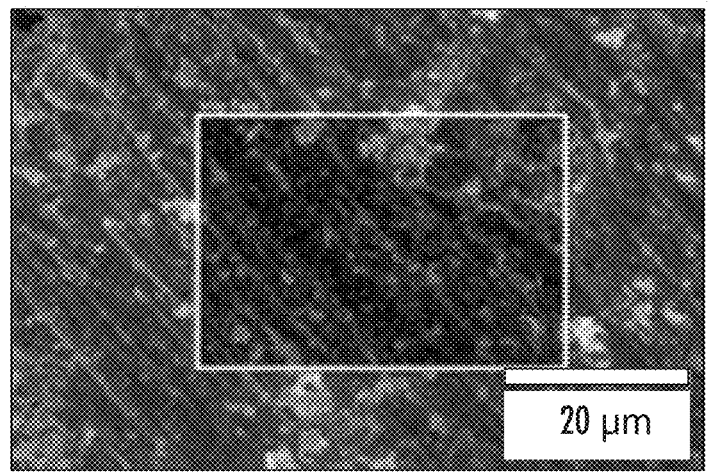
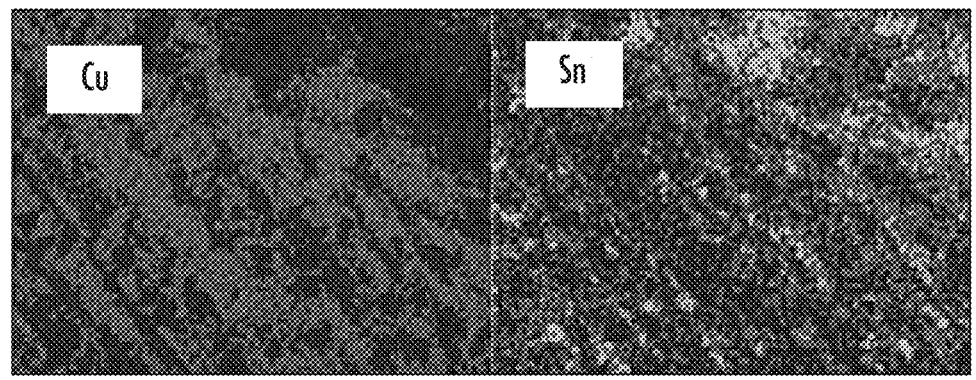
FIG. 4E

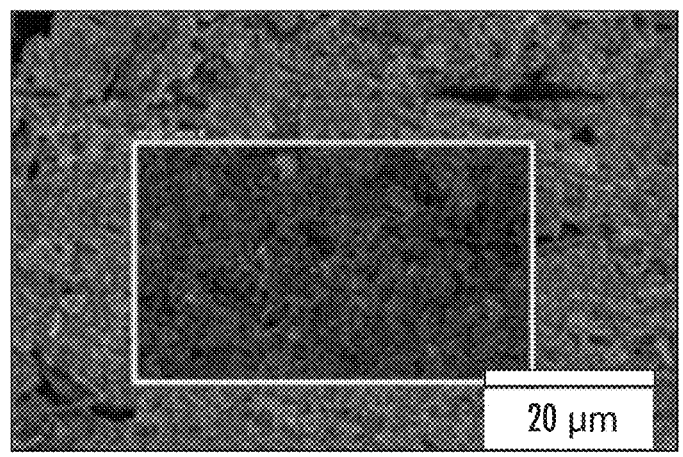
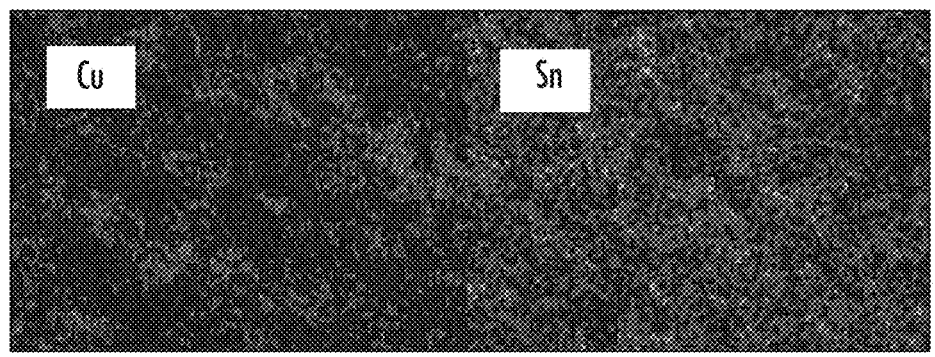
FIG. 4F

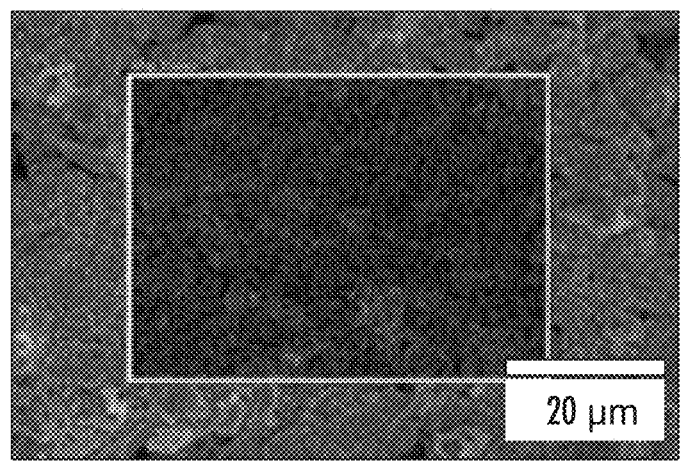
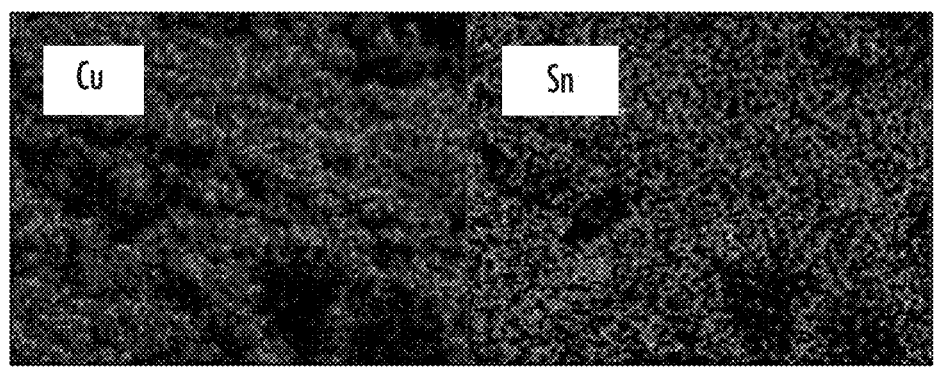
FIG. 4G

FABRICATION OF THREE-DIMENSIONAL POROUS ANODE ELECTRODE

CROSS-REFERENCE TO RELATED APPLICATIONS

This patent application claims the benefit of U.S. patent applications 62/194,564 and 62/194,677, filed Jul. 20, 2015, which are incorporated by reference along with all other references cited in this application.

BACKGROUND OF THE INVENTION

The invention relates to the field of rechargeable battery technology and more specifically to rechargeable lithium-ion battery technology.

Lithium-ion battery (LIB) technology is an important technology and is essential in many modern products and devices. Lithium-ion battery technology is used in fields such as information technology (e.g., mobile phones, smartphones, tablets, and laptop computers), transportation (e.g., electric cars), industry (e.g., portable and transportable electronics, power supplies, and chargers), and many others.

There has been an increasing demand for high-capacity battery sources, especially for large-scale applications such as electric cars and portable home power supplies. Because the performance of rechargeable lithium-ion batteries highly depends on the types of anode and cathode materials used, the development of new anode and cathode materials has gained considerable attention.

In a commercial lithium-ion battery, graphite is currently used for the anode because of its low and flat-working potential, long cycle life, and low cost. However, graphite has a theoretical capacity (379 milliamp-hours per gram) which leads to a low energy density and is insufficient for large-scale applications. Graphite also has a low transport rate which leads to a low power density. Thus, graphite is insufficient for an anode that requires both high capacity and power density.

Therefore, there is a need for an improved lithium-ion battery, especially having improved energy and power densities.

BRIEF SUMMARY OF THE INVENTION

A method of fabricating a three-dimensionally (3-D) connected metal foam structure scaffold for the electrode of lithium batteries expedites electrochemical reactions by providing a larger surface area with 3-D porous structure over conventional plates is presented. As a result, the new anode design exhibits improved cyclic performance and high-capacity in the lithium-ion battery.

In an implementation, a method includes: fabricating porous metal foams with pore size ranging from several hundred nanometers to several micrometers and applying them as a current collector (or template) for the anode of the lithium ion battery and coating the metal foam current collector with an "active" material, which can react with and store lithium ions on the surface of the anode during charging.

In an implementation, a method of fabricating porous metal foam includes: (a) freezing the metal (or metal oxide) slurry in a mold in contact with a cold surface of a copper rod; (b) sublimating the frozen slurry under reduced pressure and low temperature, forming a porous green-body; (c) sintering the porous green-body to achieve a three-dimensionally connected porous metal foam; (d) cutting the porous metal foam into the form of a thin film; (e) coating the porous metal foam with an active material, e.g., tin, on the surface of porous metal foam through a deposition process, e.g., electroless plating; and (f) heat-treating the porous metal foam coated with an active material to achieve a more uniform and robust coating layer.

In the implementation, a battery that includes the porous metal foam (scaffold), when used as the current collector, is structurally advantageous in minimizing the severe volume change and stress developed in the anode during the charging/discharging process of the lithium-ion battery. With an appropriate subsequent heat-treatment, an inactive material can also form in the composite of the current collector plus active material alloy. This formation of an inactive material can further buffer the volume change and stress developed during lithium-ion insertion/extraction, improving the cyclic performance of the anode. Further, a lithium ion battery with a porous metal anode will not degrade as rapidly as a conventional lithium ion battery with a carbon based anode when stored at high voltage or high external temperature. This is because the porous metal anode has a much higher greater surface area and has a greater resistance to temperature change than a conventional anode plate, and thus leads to better cycling and charge/discharge efficiency.

In an implementation, a lithium battery device includes a porous metal foam made from a current collector and coated with an active material onto the surface of the porous metal foam, where the porous metal foam and active material reacts with lithium ions during charging and discharging of the lithium battery. The active material can be for an anode active material. The anode active material can be at least one of graphite-based material, metal-based material, or oxide-based material.

The anode active material is selected from a group consisting of artificial graphite, natural graphite, soft carbon, hard carbon, silicon-lithium based alloys, indium-lithium based alloys, antimony-lithium based alloys, germanium-lithium based alloys, bismuth-lithium based alloys, gallium-lithium based alloys, and oxide based materials comprising at least one of tin dioxide ($SnO_2$), cobalt oxide ($Co_3O_4$), copper oxide (CuO), nickel oxide (NiO), and iron oxide ($Fe_3O_4$).

The porous metal foam made from the current collector can be made from at least one of titanium, magnesium, aluminum, nickel, copper, gold, silver, platinum, zinc, lead, silicon, cobalt, or stainless steel, or their alloys. The active material includes tin and the porous metal foam of the current collector includes copper foam. A manufacturing process to form the porous metal foam can include a freeze-casting method.

In an implementation, a method of making a metal foam using a freeze-casting process includes: placing a mold on a copper rod immersed in liquid nitrogen; pouring a metal slurry in the mold; freezing the metal slurry, where ice dendrites form and grow in the slurry and metal particles pile up between growing ice crystals; forming a porous green-body metal foam by drying the ice crystals of the frozen metal slurry at sufficiently low temperature and reduced pressure; sintering the porous green-body at sufficiently high temperature in a controlled furnace under hydrogen atmosphere to form the metal foam; and machining the metal foam into the form of thin layers, where the thin layers of the metal foam can be directly applied as free-standing electrodes in lithium batteries.

In an implementation, a method of fabricating a metal foam anode for an advanced lithium battery includes coating an active material onto a metal foam current collector, where the surface of the metal foam current collector becomes coated with the active material. An electroless plating process can be used to coat the active material onto the surface of the metal foam current collector.

Coating the active material onto the surface of the metal foam current collector using the electroless plating process including: immersing the metal foam current collector into a tin plating solution; sonicating the tin plating solution with the metal foam current collector; and heat-treating the coated metal foam current collector. At least one of Electroplating, depositing chemical vapors, evaporating, or sputtering can be used to coat the active material onto the surface of the porous current collector foam. The heat-treating process can be carried out at temperatures between about 50 degrees Celsius to about 700 degrees Celsius.

In an implementation, a method includes: placing a mold on a copper rod into liquid nitrogen and pouring a metal slurry in the mold, wherein the copper rod has relatively high thermal conductivity; freezing the metal slurry where the metal particles are piled up and physically attached between the growing ice crystals; forming a porous green-body by drying the ice crystals of the frozen slurry at sufficiently low temperature and reduced pressure, leaving pores in their places with physical attachment; and constructing the porous metal foam by reducing and sintering the porous green-body at sufficiently high temperature under hydrogen atmosphere.

In various implementations, the method includes: cutting the porous metal foam into the form of a thin layer to apply it as the current collector in a lithium-ion battery; and coating the thin layer of porous metal foam with an active material by using a deposition process. The metal slurry can include a metal oxide slurry. The deposition process can be an electroless plating. The active material for the coating can be tin, silicon, or tin dioxide.

The method can include by stirring and sonication, dissolving the metal slurry comprising a copper powder slurry and a polyvinyl alcohol binder in water. The mold can be made of a fluoropolymer resin. The copper rod can be at about −10 degrees Celsius (e.g., −10 degrees or more, −10 degrees or less, −10 degrees plus or minus 5, 10, or 20 degrees, or plus or minus 1 percent, 2, percent, 5 percent, 10 percent, or 20 percent). The forming a porous green-body can be by sublimating the frozen metal slurry in a freeze-dryer in vacuum until the ice crystals are removed. The sublimating can occur at about −88 degrees Celsius (e.g., −88 degrees or more, −88 degrees or less, −88 degrees plus or minus 5, 10, or 20 degrees, or plus or minus 1 percent, 2, percent, 5 percent, 10 percent, or 20 percent) for about 40 hours (e.g., 40 or fewer hours, or 40 or more hours, 25, 30, 35, 40 hours, plus or minus 2, 5, 10, or 20 hours, or plus or minus 1 percent, 2, percent, 5 percent, 10 percent, or 20 percent).

The method can include presintering at about 250 degrees Celsius (e.g., 250 degrees or more, 250 degrees or less, 200, 240, 245, 248, 249, 252, 253, 255, or 300 degrees, plus or minus 5, 10, or 20, 25, 50, or 75 degrees, or plus or minus 1 percent, 2, percent, 5 percent, 10 percent, or 20 percent) for about 4 hours (e.g., 4 or fewer hours, 4 or more hours, 1, 2, 3, 5, 7, or 8 hours, plus or minus 0.5, 1, 2, or 3 hours, or plus or minus 1 percent, 2, percent, 5 percent, 10 percent, or 20 percent) and then sintering at about 800 degrees Celsius (e.g., 800 degrees or more, 800 degrees or less, 800 degrees plus or minus 5, 10, or 20, 25, 50, 75, 100, 125, 150, or 200 degrees, or plus or minus 1 percent, 2, percent, 5 percent, 10 percent, or 20 percent) for about 14 hours (e.g., 14 or fewer hours, 14 or more hours, 8, 9, 10, 12, 13, 15, 16, 18, or 20 hours, plus or minus 0.5, 1, 2, 3, 4, 5, 6, or 7 hours, or plus or minus 1 percent, 2, percent, 5 percent, 10 percent, or 20 percent) in a tube furnace under about 5 percent hydrogen mixture gas (e.g., 5 or more percent, 5 or less percent, 1, 2, 3, 4, 6, 7, 8, 9, or percent, or plus or minus 0.25, 0.5, 1, 1.5, 2, or 3 percent).

The coating the thin layer of porous metal foam can include: immersing the porous metal foam into a plating solution of tin; and applying a heat-treatment process to the porous metal foam after being coated, whereby a more uniform and robust coating layer results after the heat-treatment process. During the immersion of the porous metal foam in a plating solution of tin, sonication (e.g., applying sound waves) accompanies the immersion. The result of using sonication is to achieve a more uniform coating. A plating solution of tin can include tin two chloride dehydrate, sodium hypophosphite monohydrate, thiourea, and hydrochloric acid.

The immersing the porous metal foam into a plating solution of tin can be at about 60 degrees Celsius (e.g., 60 degrees or more, 60 degrees or less, 30, 40, 50, 55, 58, 59, 61, 62, 63, 65, 70, or 80 degrees, plus or minus 5, 10, or 20, 25, 50, or 75 degrees, or plus or minus 1 percent, 2, percent, 5 percent, 10 percent, or 20 percent) for about 1 minute (e.g., 1 or less minutes, 1 or more minutes, 0.5, 1.5, 2, 3, 4, or 5 minutes, plus or minus 0.5 minute, or plus or minus 1 percent, 2, percent, 5 percent, 10 percent, or 20 percent).

The heat-treatment process to the porous metal foam after being coated can be at about 100 degrees Celsius or at about 500 degrees Celsius (e.g., 100 or 500 degrees or more, 100 or 500 degrees or less, 95, 105, 55, 150, 400, 450, 550, or 600 degrees, plus or minus 5, 10, or 20, 25, 50, or 75 degrees, or plus or minus 1 percent, 2, percent, 5 percent, 10 percent, or 20 percent) in a tube furnace under argon (or another inert gas) atmosphere.

In another implementation, a method includes: placing a mold on a copper rod into liquid nitrogen and pouring a metal or metal oxide slurry in the mold; using a first temperature, freezing the metal or metal oxide slurry where the metal or metal oxide particles are piled up and physically attached between the growing ice crystals; forming a porous green-body by drying the ice crystals of the frozen slurry at a second temperature and reduced pressure, leaving pores in their places with physical attachment, wherein the second temperature is lower than the first temperature; constructing the porous metal foam by reducing and sintering the porous green-body at a third temperature under hydrogen atmosphere, wherein the third temperature is higher than the first and second temperatures; cutting the porous metal foam into the form of a thin layer to apply it as the current collector in a lithium-ion battery; and coating the thin layer of porous metal foam with an active material comprising heat treatment under argon atmosphere. The heat treatment under argon atmosphere can be at a fourth temperature that is higher than the third temperature or lower than the third temperature.

In another implementation, a lithium battery device includes: a porous metal foam made from a current collector and coated with an active material onto the surface of the porous metal foam, wherein the porous metal foam and active material reacts with lithium ions during charging and discharging of the lithium battery. The porous metal foam is formed by a method including: using a first temperature, freezing a metal or metal oxide slurry where the metal or metal oxide particles are piled up and physically attached between the growing ice crystals; forming a porous green-body by drying the ice crystals of the frozen slurry at a second temperature and reduced pressure, leaving pores in their places with physical attachment, wherein the second temperature is lower than the first temperature; constructing the porous metal foam by reducing and sintering the porous green-body at a third temperature under hydrogen atmosphere, wherein the third temperature is higher than the first and second temperatures; cutting the porous metal foam into the form of a thin layer to apply it as the current collector in a lithium-ion battery; and coating the thin layer of porous metal foam with the active material comprising heat treatment under argon or other inert gas (e.g. nitrogen, helium, or a noble gas) atmosphere.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 3A-3B show X-ray diffraction (XRD) spectrums of copper foam, tin-coated copper foam, and heat-treated tin-coated copper foam to confirm the phases present in the materials according to the present invention.

FIGS. 4A-4G show scanning electron microscope (SEM) images and energy dispersive X-ray (EDX) spectra of copper foam, tin-coated copper foam, and heat-treated tin-coated copper foam.

DETAILED DESCRIPTION OF THE INVENTION

One solution to increase the energy density of a battery is to use lithium-alloy materials for the anode instead of graphite because of the lithium-alloy's higher theoretical capacity. However, lithium-alloys have their own drawbacks. Anodes, made of lithium-alloy materials, generally suffer from severe volumetric expansion (up to 300 percent) during lithium-ion charging. These volume changes cause both pulverization and loss of electrical contact in the electrode during cycling, which inevitably results in a premature failure or decreased capacity of the lithium-ion battery.

A technique that directly achieves improvements to a lithium-ion battery's capacity and lithium diffusion rate as well as minimizes or reduces volume expansion of the active material during lithium ion charging is described below.

A method of fabricating a three-dimensional metal foam structure and a uniform coating on the surface of the metal foam for use as an advanced anode of lithium batteries is presented. The method consists of the following steps: making porous metal foam with pores ranging from several hundred nanometers to several micrometers in size for use as a current collector; coating the porous metal foam with an active material on the surface of the porous metal foam through a deposition process, and heat-treating the porous metal foam coated with the active material to achieve a more uniform and robust coating layer.

Figure 1A:
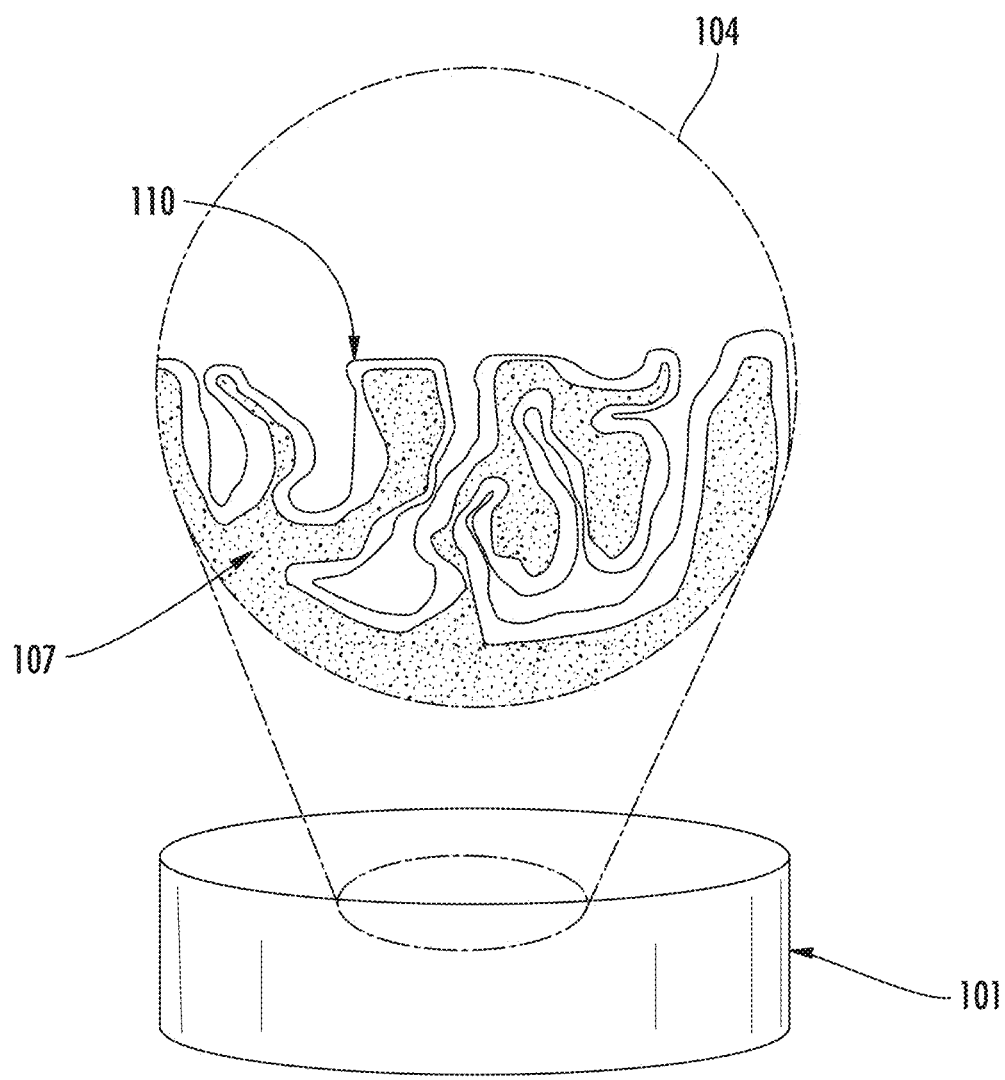
FIG. 1A shows an embodiment of an electrode made of a foam current collector coated with an active material.

FIG. 1A shows an anode electrode 101 for a lithium-ion battery that is made of a porous metal foam. The anode electrode is a current collector for the battery. A view 104 a shows magnified cross section of a portion the anode electrode. Referring to view 104, there is a porous metal foam 107 that is coated with an active material layer coating 110. Compared to a solid metal anode, the metal foam current collector has much greater surface area and is a significantly better current collector for a given area or volume.

The porous metal foam is advantageous in expediting electrochemical reactions by utilizing their larger surface area, larger than conventional or perforated plates, and shorter transport distances. The addition of active material layer coating 110 enhances the reaction of the porous metal foam 110 with lithium ions during charging as described below in specific embodiments. The three-dimensional porous structure can also accommodate the volume change and stress developed by using the voids spaced regularly from the porous structure. Futher, the existence of an inactive material, after an active material is coated, will buffer the volume change during the process of Lithium-ion insertion/extraction.

In a specific implementation, the metal foam is made of porous copper and the active material layer coating is made of tin. However, in other implementations, other materials may be used. A number of metallic elements can be used in the fabrication of the porous metal foam for use as the anode because most metals inherently have high electrical conductivity and appropriate electrochemical potential. Such metallic elements include, for example, copper, nickel, aluminum, cobalt, gold, silver, stainless steel, and others. Copper is typically selected for use as the anode current collector of the lithium battery because of its relatively higher electrical conductivity and appropriate electrochemical potential.

The porous metal foam has a three-dimensionally connected porous structure with pore sizes ranging from several hundred nanometers to several micrometers. Porous metal can be fabricated according to a number of techniques. For example, three-dimensional copper foam is fabricated through a freeze-casting method as an example manufacturing process. U.S. patent application Ser. No. 13/930,887 describes a freeze-casting technique and is incorporated by reference. This process is a simple, low-cost processing method, which is suitable for fabricating large-scale porous structure. However, the manufacturing process of the porous metal foam is not limited to the freeze-casting method. Other methods can also be utilized.

In an implementation, the surface of the porous metal foam used for the anode is coated with an active material, which can be done by using one of several different techniques. In one embodiment, electroless plating is used to achieve a thin, uniform coating of tin (Sn) as an active material onto the surface of the porous metal foam. The porous copper foam is dipped in a chemical solution with tin ions, and the copper foam becomes coated with tin. Other techniques, such as electroplating, chemical vapor deposition (CVD), evaporation and sputtering, and others, may also be used. However, electroless tin plating is used because the process can be applied without the use of an external electrical charge and can result in a thin, smooth, and uniform coating layer, even on complex shapes.

The present invention can be further modified to fabricate numerous types of porous metal foams for use as the three-dimensional current collector template of advanced lithium ion batteries. In addition, a variety of coating materials and coating application techniques can be applied to produce a free-standing electrode.

Specific flow implementations are presented in this patent, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on other factors.

Figure 1B:
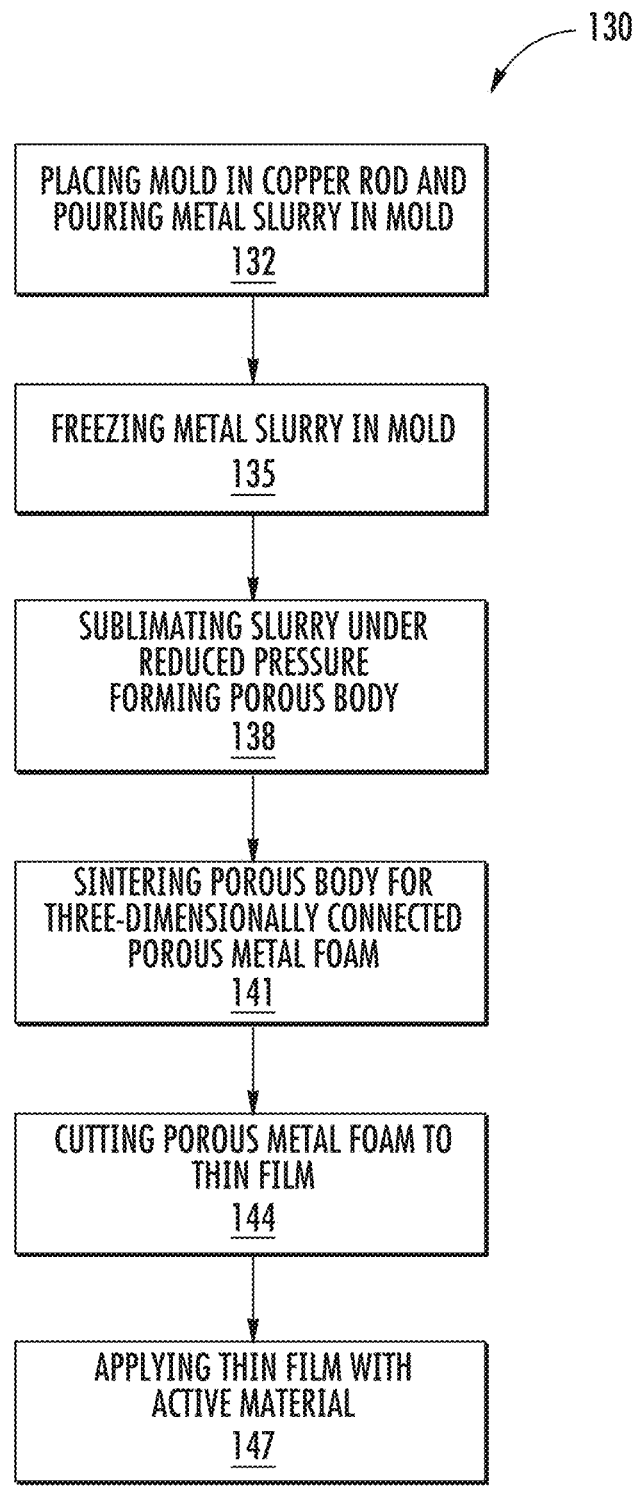
FIG. 1B shows a flow diagram of fabricating an electrode made of a foam current collector coated with an active material.

FIG. 1B shows a method 130 for fabricating the porous metal foam with an active material used as an electrode of a lithium battery. The method includes:

(1) Referring to a step 132, placing a mold on a copper rod (with high thermal conductivity) into liquid nitrogen and pouring a metal (or metal oxide) slurry in the mold.

(2) Referring to a step 135, freezing the metal (or metal oxide) slurry where the metal (or metal oxide) particles are piled up and physically attached between the growing ice crystals.

(3) Referring to a step 138, forming a porous green-body by drying the ice crystals of the frozen slurry at sufficiently low temperature and reduced pressure, leaving pores in their places with physical attachment.

(4) Referring to a step 141, constructing the porous metal foam by reducing and sintering the porous green-body at sufficiently high temperature under hydrogen atmosphere.

(5) Referring to a step 144, cutting the porous metal foam into the form of a thin layer to apply it as the current collector in a lithium-ion battery.

(6) Referring to a step 147, includes coating the thin layer of porous metal foam with an active material by using a deposition process such as electroless plating. The active materials used in step 147 for the electroless plating process can include tin, silicon, tin dioxide ($SnO_2$), and others. In this invention, tin was used as an example active material.

Figure 1C:
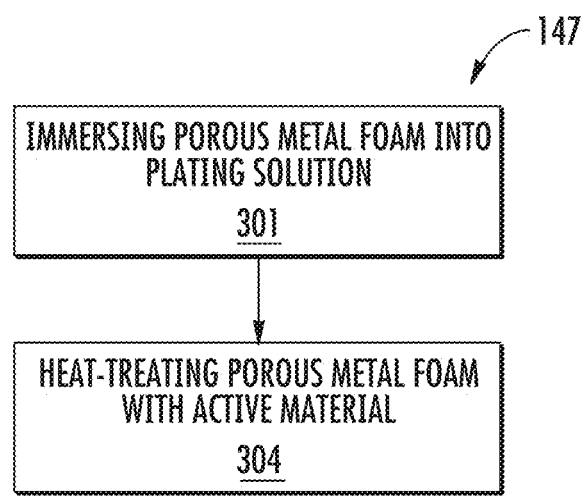
FIG. 1C shows a specific method of coating an active material onto a foam current collector.

FIG. 1C shows a specific method of coating an active material onto the porous metal foam as described in step 147 of FIG. 1B. The method includes:

(6.1) Referring to a step 301, immersing the porous metal foam into a plating solution of tin. During the immersion of the porous metal foam in a plating solution of tin, sonication may be accompanied to achieve a more uniform coating even on the complex shapes.

(6.2) Referring to a step 304, applying a heat-treatment process to the porous metal foam after being coated for a more uniform and robust coating layer.

Some specific embodiments are presented below. These embodiments are provided only to describe some examples of detailed implementations, and it will be apparent to those skilled in the art to that the scope of the present invention is not limited by the embodiments.

Exemplary Embodiment 1

Copper powder slurry, which consists of 13.7 volume percent copper oxide powder and 2.5 weight percent polyvinyl alcohol (PVA) binder is created by using 30 milliliter deionized water. The slurry is dissolved in the solution by stirring and using sonication. The slurry is then poured into a fluoropolymer resin or Teflon mold placed on the chilled copper rod. The temperature of the top of the copper rod is fixed at −10 degrees Celsius by using liquid nitrogen and maintained by using a controller. Teflon is a synthetic fluorine-containing resins or fluoropolymer resins. Teflon is a trademark of Chemours Company FC, LLC.

After the slurry is completely frozen, it is sublimated at −88 degrees Celsius for 40 hours in a freeze-dryer in vacuum, resulting in removal of the ice crystals and leaving a green-body with directional pores. The green-body is then reduced from copper oxide to pure copper in hydrogen atmosphere and is subsequently sintered at higher temperature. Reduction and sintering processes consist of pre-sintering at 250 degrees Celsius for 4 hours and actual sintering at 800 degrees Celsius for 14 hours in a tube furnace under 5 percent hydrogen mixture gas.

Exemplary Embodiment 2

The solution of tin plating is comprised of 10 grams per liter of tin two chloride dihydrate ($SnCl_2.2H_2O$), 10 grams per liter of sodium hypophosphite monohydrate ($NaH_2PO_2.2H_2O$), 70 grams per liter of thiourea ($CS(NH_2)_2$), and 5.6 milliliter per liter of concentrated hydrochloric acid (36 weight percent). After copper foam was machined into a form of a thin layer suitable for the lithium ion battery coin-cell test, the thin-layer copper foam was immersed into the tin plating solution at 60 degrees Celsius for 1 minute.

While the copper foam was immersed, sonication was also used to achieve a more uniform tin coating layer. After applications of plating and washing processes, the tin-coated copper foam electrode was heat-treated either at 100 degrees Celsius or 500 degrees Celsius in a tube furnace under argon atmosphere.

Figure 2:
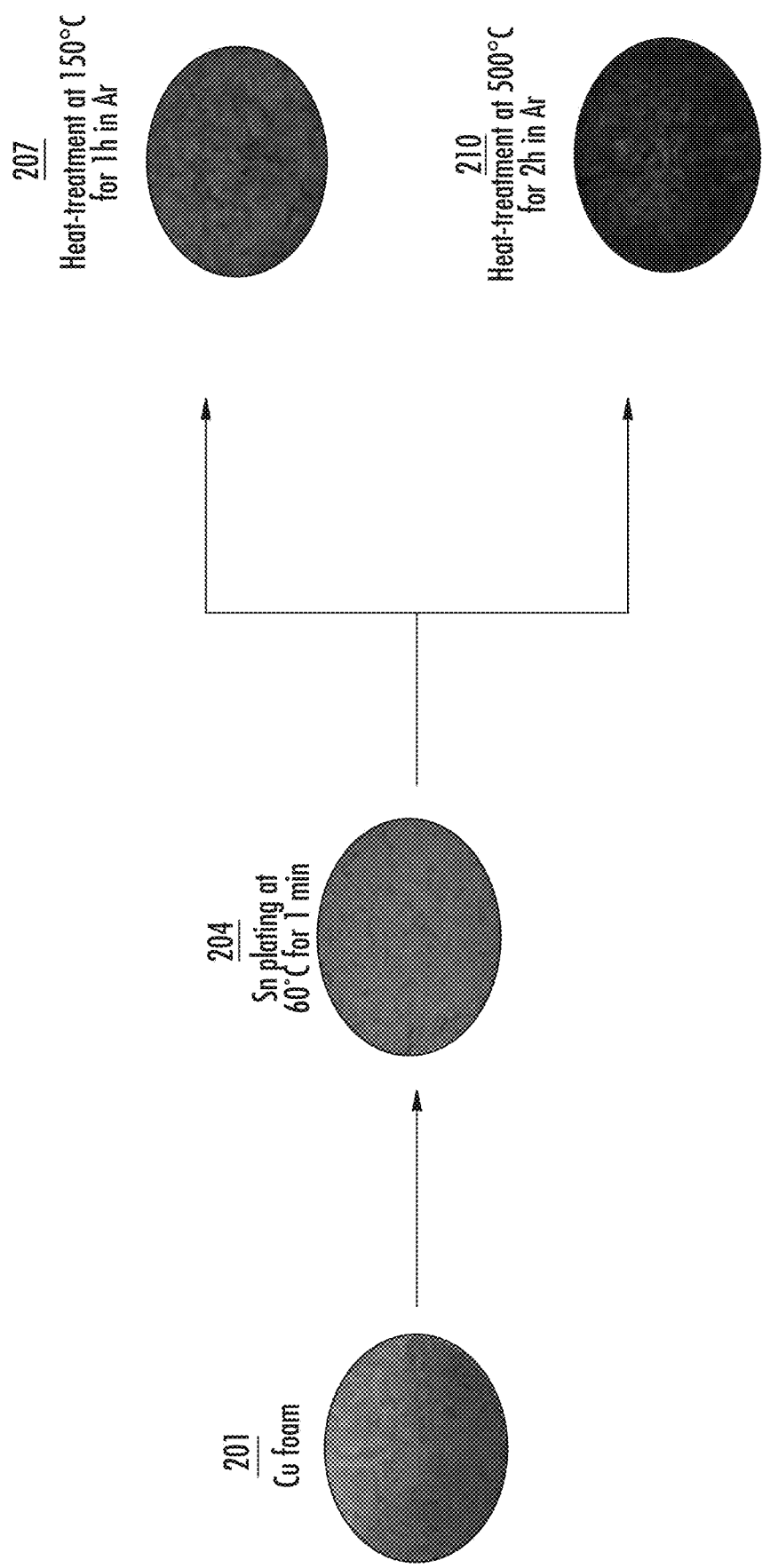
FIG. 2 shows representative photographs of copper foam, tin-coated copper foam, and the tin-coated copper foam with heat-treatment.
Figures 4A, 4B:
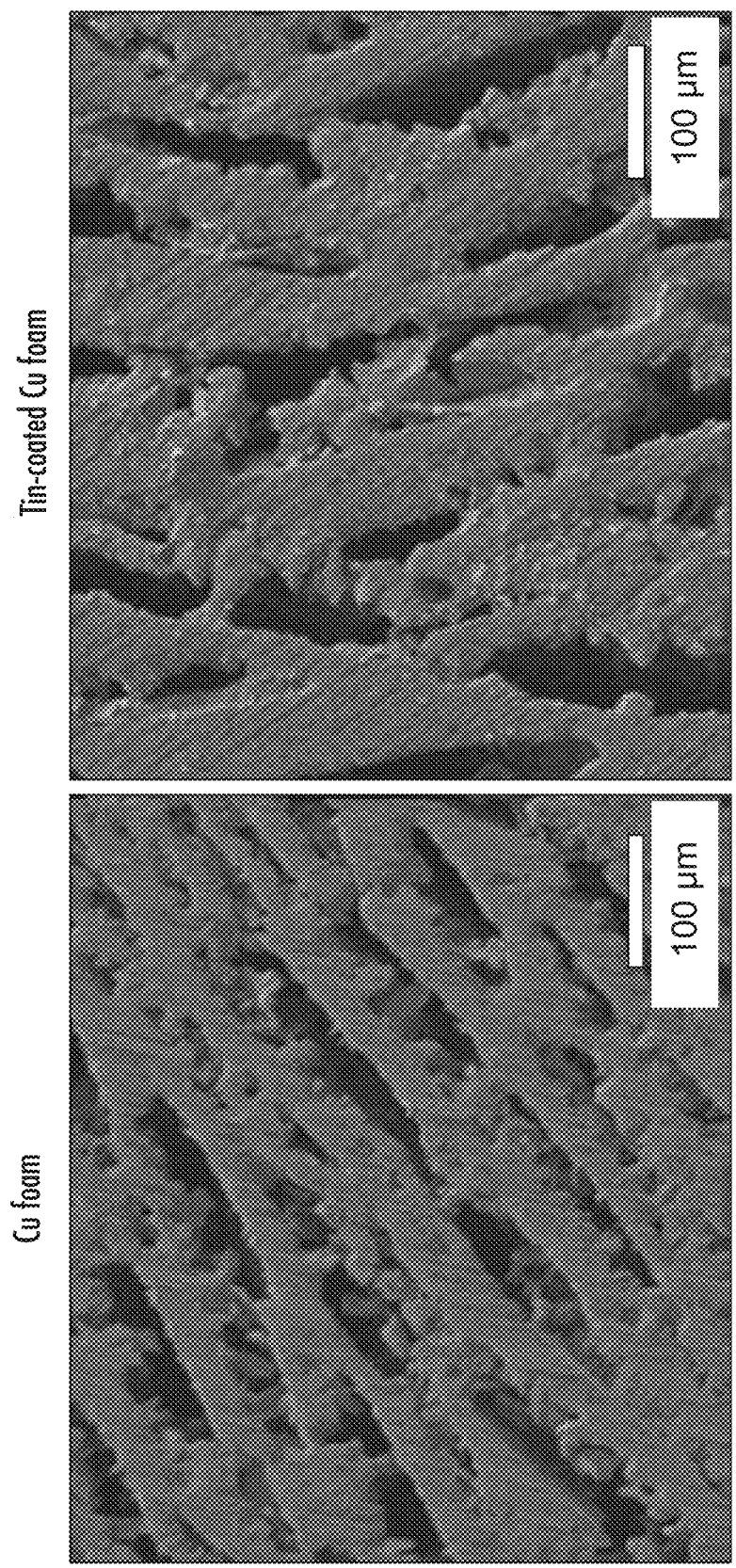
Figures 4C, 4D:
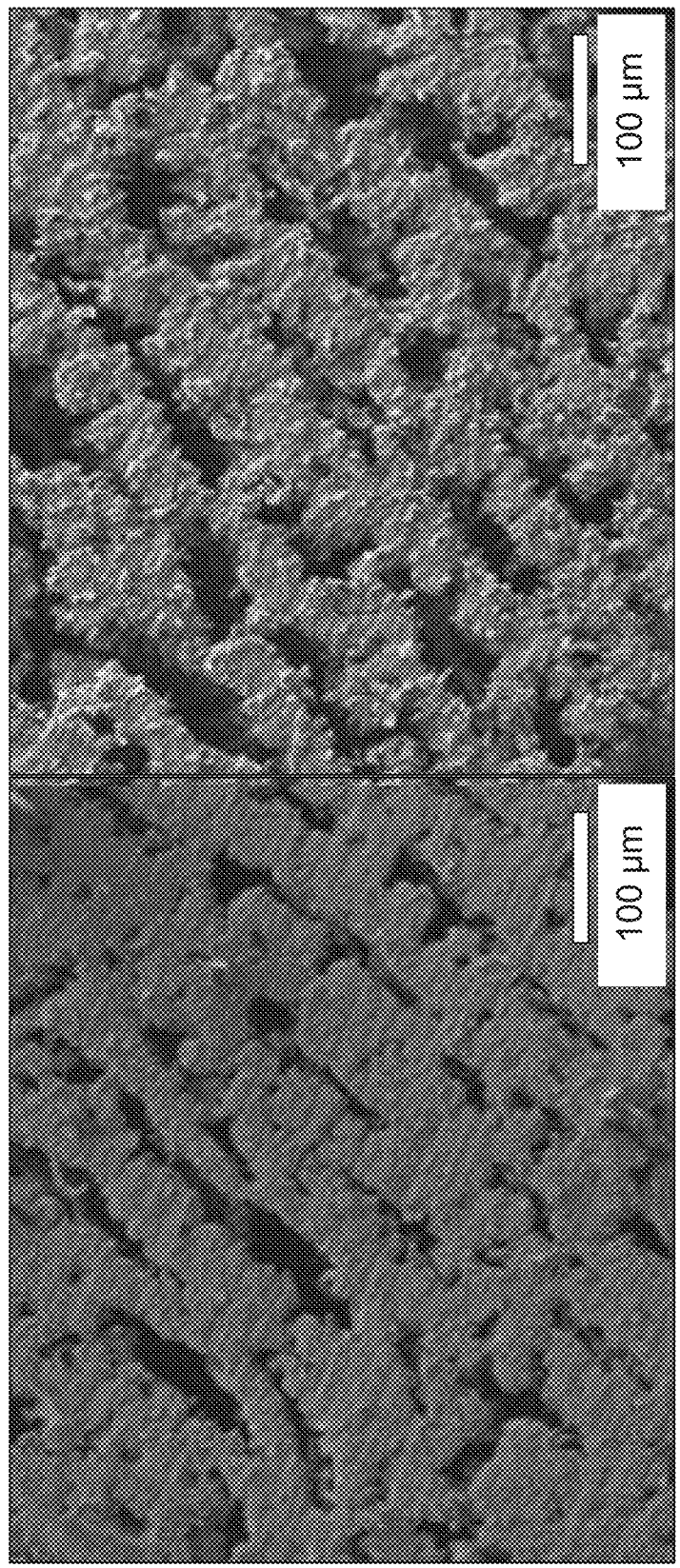

FIG. 2 shows optical photographs of copper foam and tin-coated copper foam without/with heat-treatment at 150 degrees Celsius and 500 degrees Celsius. A copper foam 201 is a red and brown color. After plating copper foam 201 with tin at 60 degrees Celsius for 1 minute, the copper foam becomes tin plated copper foam 204 and has a gray color. In one embodiment, tin plated copper foam 204 becomes darkened after a heat-treatment at 150 degrees Celsius for 1 hour to become heat-treated tin plated copper 207.

The darkened color forms because of an increase in copper content in the tin layer caused by an inter-diffusion process during heat-treatment. In another embodiment, tin plated copper foam 204 becomes brown after a heat-treatment at 500 degrees Celsius for 2 hours to become heat-treated tin plated copper foam 210. The brown color forms because an oxide layer has been formed under argon atmosphere.

FIG. 3A shows the X-ray diffraction patterns of the tin-coated copper foam before/after heat-treatment which confirms the formation of $Cu_6Sn_5$ intermetallic compound after heat-treatment at 150 degrees Celsius for 1 hour. FIG. 3B shows the X-ray diffraction patterns of the tin-coated copper foam before/after heat-treatment which confirms the formation of tin dioxide ($SnO_2$) phase after heat-treatment at 500 degrees Celsius for 2 hours.

FIGS. 4A-4G show scanning electron microscope (SEM) images and energy dispersive X-ray (EDX) spectra of copper foam, tin-coated copper foam, and heat-treated tin-coated copper foam.

Figure 5A:
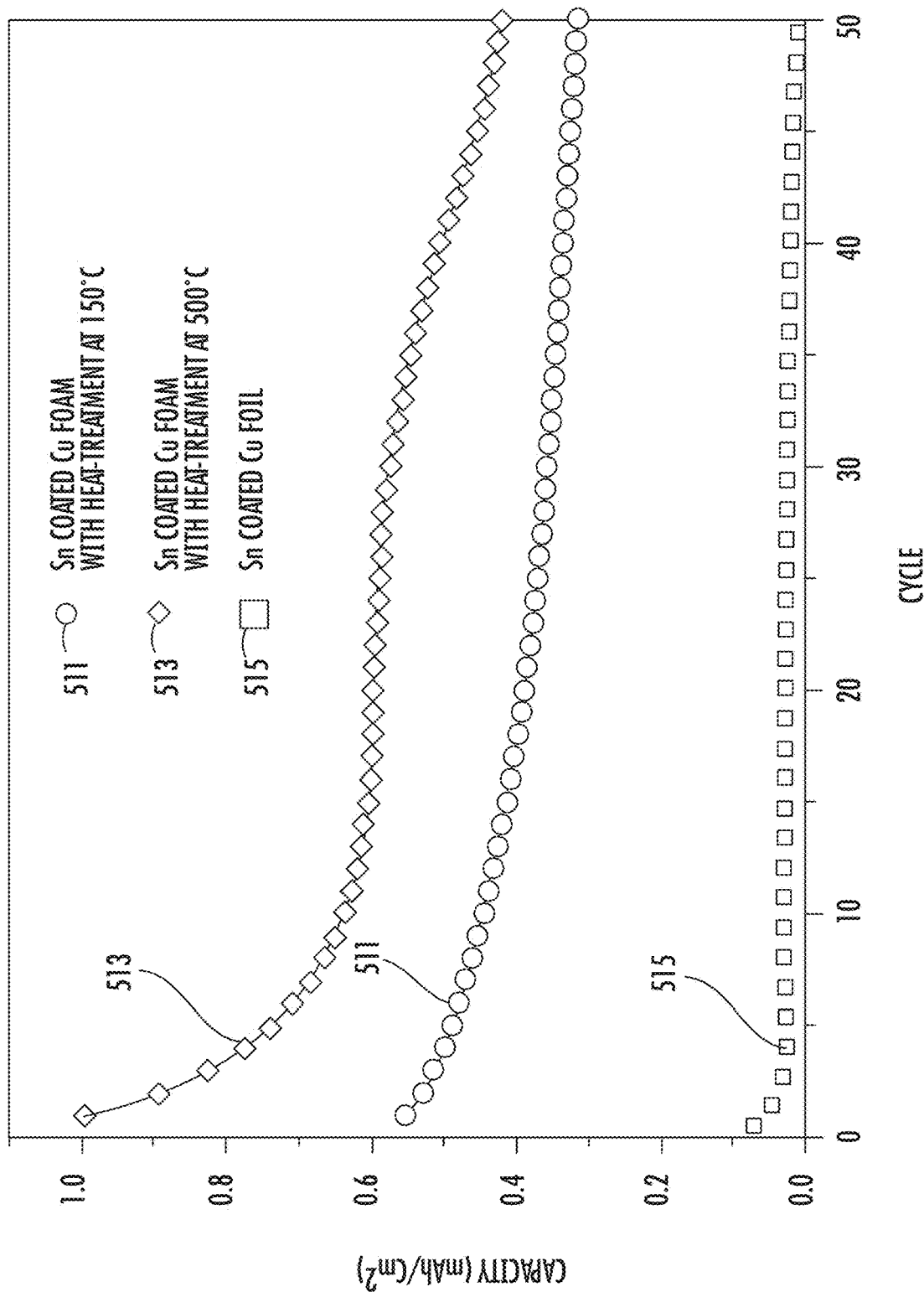
FIGS. 5A-5B show test plots of coin-cell batteries of specific capacity and Coulombic efficiency as a function of cycle numbers at the charge-discharge rate of 1 C in order to demonstrate performance of the present invention as compared to the conventional anode material.
Figure 5B:
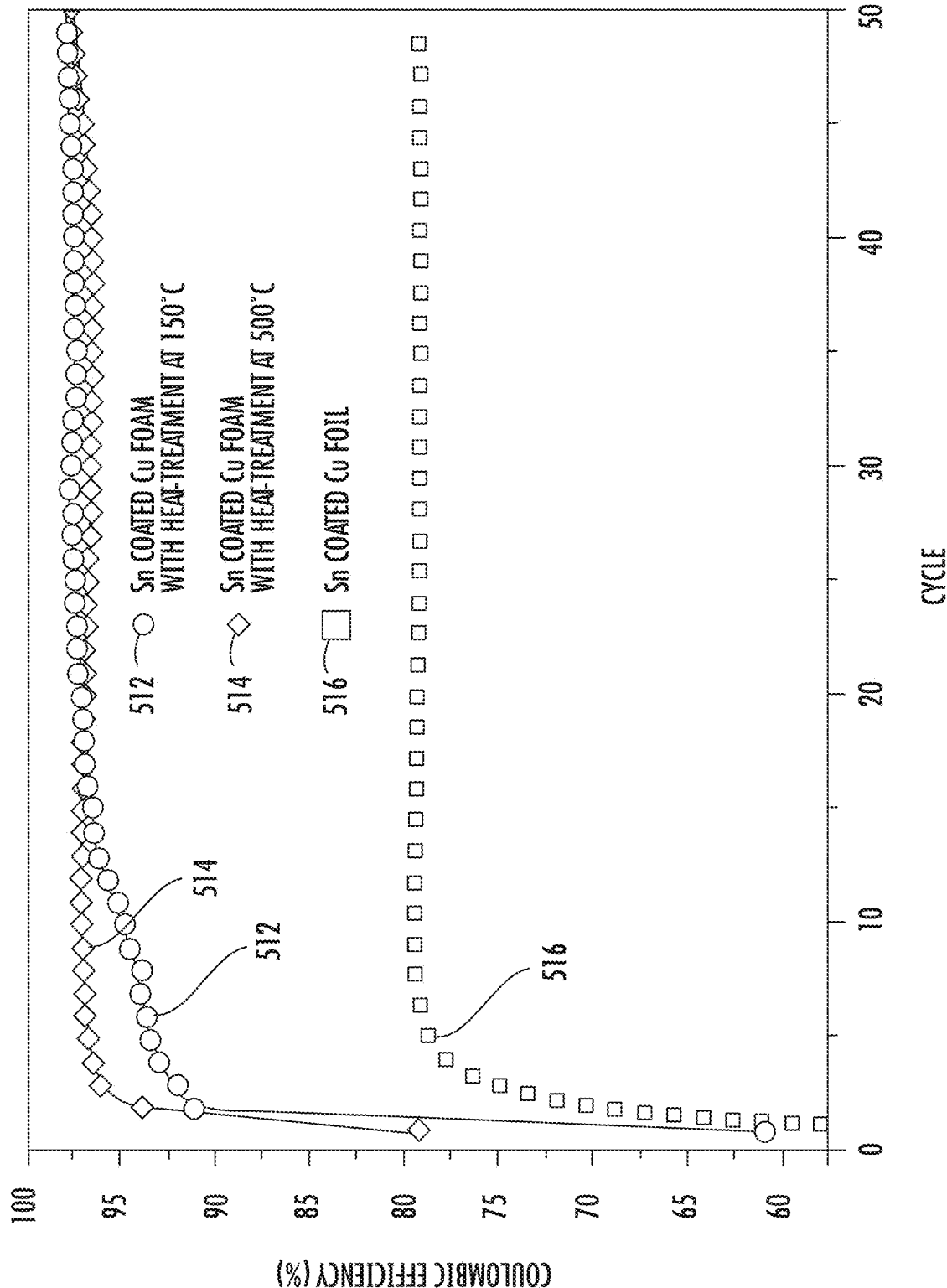

FIGS. 5A and 5B show the coin-cell-test cyclic performance of the tin-coated copper foam anode fabricated in aforementioned examples 1 and 2. FIG. 5A shows the initial charge capacity of a tin-coated copper foam with heat-treatment at 150 degrees Celsius curve 511 and a tin-coated copper foam with heat-treatment at 500 degrees Celsius curve 513 is 0.99 milliamp-hour per centimeter squared and 0.55 milliamp-hour per centimeter squared, respectively. It is apparent that the subsequent heat-treatment process influences the cycle performance of the tin-coated copper foam anode. This is because different phases end up forming after the heat-treatment process.

For example, a combination of tin (994 milliamp-hour per gram) and Cu6Sn5 (604 milliamp-hour per gram) exists in the tin-coated copper foam with the heat-treatment at 150 degrees Celsius for 1 hour, whereas only tin dioxide (781 milliamp-hour per gram) exists in the tin-coated copper foam with heat-treatment at 500 degrees Celsius for 2 hours. Consequently, the sample with heat-treatment at 150 degrees Celsius for 1 hour exhibits a more stable cyclic performance than the sample with heat-treatment at 500 degrees Celsius for 2 hours as shown in curve 511 and curve 513.

By using the three-dimensional porous copper foam as the current collector described in exemplary embodiments 1 and 2, higher capacity and better cyclic performance are achieved as compared to those of the baseline copper foil. There are several reasons suggested in support of the higher capacity. First, the three-dimensional porous copper current collector enables the following advantages due to its unique architecture: (i) easy diffusion of lithium-ions and electrons, (ii) higher electrode/electrolyte interfacial contact area, and (iii) better accommodation to structural strain during reaction.

Second, after coating an active material to a pure porous metal such as porous copper, the existence of an inactive material such as copper in copper-tin alloy or oxide in a tin-oxide layer can favorably buffer the volume change during the process of Lithium-ion insertion/extraction. Accordingly, the three-dimensional porous copper-tin alloy and copper-tin dioxide (Cu—SnO2) electrode exhibit more stable cycling performance than pure tin metal electrode. FIG. 5B shows a Coulombic efficiency of the tin-coated copper foam curve 512 and curve 514 compared to that of a conventional tin-coated copper foil curve 516. The Coulombic efficiency of the heat-treated tin-coated copper foam is greater than that of tin-coated copper without the heat-treatment.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   placing a mold on a copper rod into liquid nitrogen and pouring a metal slurry in the mold;
   freezing the metal slurry where metal particles are piled up and physically attached between growing ice crystals;
   forming a porous green-body by drying the ice crystals of the frozen slurry at a first temperature, leaving pores in their places with physical attachment;
   constructing a porous metal foam by reducing and sintering the porous green-body at a second high temperature under hydrogen atmosphere, wherein the second temperature is higher than the first temperature, and the sintering comprises:
   presintering at about 250 degrees Celsius for about 4 hours and then sintering at about 800 degrees Celsius for about 14 hours in a tube furnace under about 5 percent hydrogen mixture gas;
   cutting the porous metal foam into a form of a thin layer to apply it as a current collector in a lithium-ion battery; and
   coating the thin layer of porous metal foam with a tin active material by using a deposition process, wherein the coating the thin layer of porous metal foam with a tin active material is by using a deposition process comprising:
   immersing the porous metal foam into a plating solution of tin; and
   applying a heat-treatment process to the porous metal foam after being coated.

2. The method of claim 1 wherein the metal slurry comprises a metal oxide slurry.

3. The method of claim 1 wherein the active material for the coating comprises at least one of tin, silicon, or tin dioxide.

4. The method of claim 1 comprises:
   dissolving the metal slurry by stirring and sonication, wherein the metal slurry comprises a copper powder and a polyvinyl alcohol binder in water.

5. The method of claim 1 wherein the forming a porous green-body by drying the ice crystals of the frozen slurry comprises:
   sublimating the frozen metal slurry in a freeze-dryer in a vacuum until the ice crystals are removed.

6. The method of claim 5 wherein the sublimating occurs at about −88 degrees Celsius for about 40 hours.

7. The method of claim 1 wherein during the immersion of the porous metal foam in a plating solution of tin, sonication accompanies the immersion.

8. The method of claim 1 wherein the plating solution of tin comprises tin two chloride dihydrate, sodium hypophosphite monohydrate, thiourea, and hydrochloric acid.

9. A method comprising:
   placing a mold on a copper rod into liquid nitrogen and pouring a metal slurry in the mold;
   freezing the metal slurry where metal particles are piled up and physically attached between growing ice crystals;
   forming a porous green-body by drying the ice crystals of the frozen slurry at a first temperature, leaving pores in their places with physical attachment;
   constructing a porous metal foam by reducing and sintering the porous green-body at a second temperature under hydrogen atmosphere, wherein the second temperature is higher than the first temperature, and the sintering comprises:
   presintering at about 250 degrees Celsius for about 4 hours and then sintering at about 800 degrees Celsius for about 14 hours in a tube furnace under about 5 percent hydrogen mixture gas;
   cutting the porous metal foam into form of a thin layer to apply it as current collector in a lithium-ion battery; and
   coating the thin layer of porous metal foam with a tin active material by using a deposition process, wherein the coating the thin layer of porous metal foam with a tin active material is by using a deposition process comprising:

immersing the porous metal foam into a plating solution of tin; and applying a heat-treatment process to the porous metal foam after being coated, wherein the plating solution of the tin comprises tin two chloride dihydrate, sodium hypophosphite monohydrate, thiourea, and hydrochloric acid, and the immersing the porous metal foam into a plating solution of tin occurs at about 60 degrees Celsius for about 1 minute.

10. The method of claim 9 wherein the heat-treatment process to the porous metal foam after being coated occurs at or above about 100 degrees Celsius in a tube furnace under argon atmosphere.

11. A method comprising:

placing a mold on a copper rod into liquid nitrogen and pouring a metal or metal oxide slurry in the mold;

using a first temperature, freezing the metal or metal oxide slurry where metal or metal oxide particles are piled up and physically attached between growing ice crystals;

forming a porous green-body by drying the ice crystals of the frozen slurry at a second temperature and reduced pressure, leaving pores in their places with physical attachment, wherein the second temperature is lower than the first temperature;

constructing a porous metal foam by reducing and sintering the porous green-body at a third temperature under hydrogen atmosphere, wherein the third temperature is higher than the first and second temperatures, and the sintering comprises:

presintering at about 250 degrees Celsius for about 4 hours and then sintering at about 800 degrees Celsius for about 14 hours in a tube furnace under about 5 percent hydrogen mixture gas;

cutting the porous metal foam into a form of a thin layer to apply it as a current collector in a lithium-ion battery; and coating the thin layer of porous metal foam with a tin active material, wherein the coating the thin layer of porous metal foam with a tin active material comprises:

immersing the porous metal foam into a plating solution of tin, wherein the plating solution comprises tin two chloride dihydrate, sodium hypophosphite monohydrate, thiourea, and hydrochloric acid, the immersing the porous metal foam into a plating solution of tin occurs at about 50 degrees Celsius or greater for about 5 minutes or less, during the immersion of the porous metal foam in a plating solution of tin, sonication accompanies the immersion; and applying a heat-treatment process to the porous metal foam after being coated, wherein the heat treatment occurs in an argon atmosphere.

12. The method of claim 11 wherein the heat treatment under argon atmosphere is at a fourth temperature that is lower than the third temperature.

13. The method of claim 1 wherein the plating solution of tin comprises thiourea.

14. The method of claim 1 wherein the plating solution of tin comprises sodium hypophosphite monohydrate.

15. The method of claim 1 wherein the immersing the porous metal foam into a plating solution of tin is for about 2 minutes or less.

16. The method of claim 1 wherein the immersing the porous metal foam into a plating solution of tin occurs in range from about 50 degrees to 70 degrees Celsius.

17. A method comprising:

placing a mold on a copper rod into liquid nitrogen and pouring a metal slurry in the mold;

freezing the metal slurry where metal particles are piled up and physically attached between growing ice crystals;

forming a porous green-body by drying the ice crystals of the frozen slurry at a first temperature, leaving pores in their places with physical attachment, wherein the forming a porous green-body by drying the ice crystals of the frozen slurry comprises:

sublimating the frozen metal slurry in a freeze-dryer in a vacuum until the ice crystals are removed, wherein the sublimating occurs at about −88 degrees Celsius for about 40 hours;

constructing a porous metal foam by reducing and sintering the porous green-body at a second high temperature under hydrogen atmosphere, wherein the second temperature is higher than the first temperature;

cutting the porous metal foam into a form of a thin layer to apply it as a current collector in a lithium-ion battery; and coating the thin layer of porous metal foam with a tin active material by using a deposition process, wherein the coating the thin layer of porous metal foam with a tin active material is by using a deposition process comprising:

immersing the porous metal foam into a plating solution of tin; and applying a heat-treatment process to the porous metal foam after being coated.

* * * * *